(12) United States Patent
Konishi (10) Patent No.: US 8,638,841 B2
(45) Date of Patent: Jan. 28, 2014

(54) TRANSMITTING/RECEIVING SYSTEM, TRANSMITTING/RECEIVING METHOD, AND COMPUTER READABLE MEDIUM FOR ESTIMATING TEMPORAL FLUCTUATION OF A SIGNAL

(75) Inventor: Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/571,554

(22) Filed: Aug. 10, 2012

(65) Prior Publication Data

US 2013/0176499 A1    Jul. 11, 2013

(30) Foreign Application Priority Data

Jan. 10, 2012    (JP) .................................. 2012-002401

(51) Int. Cl.
*H04B 3/46*    (2006.01)
(52) U.S. Cl.
USPC ........... 375/228; 375/226; 375/227; 375/371; 455/63.1; 702/69; 702/81
(58) Field of Classification Search
None
See application file for complete search history.

(56) References Cited

U.S. PATENT DOCUMENTS

| 8,253,697 B2 * | 8/2012 | Fleck et al. .................... 345/173 |
| 2009/0207897 A1 * | 8/2009 | Yamaguchi et al. .......... 375/226 |

FOREIGN PATENT DOCUMENTS

JP    2001-119354 A    4/2001

* cited by examiner

*Primary Examiner* — Adolf Dsouza
(74) *Attorney, Agent, or Firm* — Sughrue Mion, PLLC (57) ABSTRACT

A transmitting/receiving system includes two transmitting/receiving apparatuses connected through a transmission cable having two one-direction signal lines. Each apparatus includes a transmitting unit that transmits a signal, a receiving unit that receives a signal, a calculator, a controller, a storage, and an estimating unit. The calculator calculates an Signal to Noise (S/N) ratio of the received signal. The controller controls the calculation by obtaining, as a first value, a strength of a signal caused by a check signal transmitted during absence of a check signal being received, obtaining, as a second value, a strength of a check signal received during absence of a check signal being transmitted, and dividing the second value by the first value. The storage stores relationship between a predetermined transmission-cable S/N ratio and temporal signal fluctuation. The estimating unit estimates temporal signal fluctuation from the calculated S/N ratio and the relationship.

7 Claims, 7 Drawing Sheets

TRANSMITTING/RECEIVING SYSTEM, TRANSMITTING/RECEIVING METHOD, AND COMPUTER READABLE MEDIUM FOR ESTIMATING TEMPORAL FLUCTUATION OF A SIGNAL

CROSS-REFERENCE TO RELATED APPLICATIONS

This application is based on and claims priority under 35 USC 119 from Japanese Patent Application No. 2012-002401 filed Jan. 10, 2012.

BACKGROUND (i) Technical Field

The present invention relates to a transmitting/receiving system, a transmitting/receiving method, and a computer readable medium.

(ii) Related Art

In high-speed serial transmission in which a signal is transmitted at a speed of on the order of giga bits per second (Gbps) over a long distance, a system is known which achieves bidirectional communication between a first apparatus and a second apparatus by using a transmission cable. In such a system, link-up is typically established for the first apparatus and then for the second apparatus.

SUMMARY

According to an aspect of the invention, there is provided a transmitting/receiving system including a pair of transmitting/receiving apparatuses that are connected to each other through a transmission cable having first and second signal lines, through each of which a signal is transmitted in one direction. Each of the transmitting/receiving apparatuses includes a transmitting unit, a receiving unit, a calculator, a controller, a storage unit, and an estimating unit. The transmitting unit transmits the signal through a corresponding one of the first and second signal lines. The receiving unit receives the signal through a corresponding one of the first and second signal lines. The calculator calculates a signal-to-noise ratio of the signal received through a corresponding one of the first and second signal lines by the receiving unit. The controller controls the calculator to calculate the signal-to-noise ratio by obtaining, as a first value, a strength of a signal received by the receiving unit when the transmitting unit transmits a check signal through a corresponding one of the first and second signal lines in a state in which the receiving unit has not received a check signal through a corresponding one of the first and second signal lines, obtaining, as a second value, a signal strength obtained when the check signal is received through a corresponding one of the first and second signal lines by the receiving unit in the state in which the transmitting unit does not transmit a check signal through a corresponding one of the first and second signal lines, and dividing the second value by the first value. The storage unit stores relationship information about a relationship between a signal-to-noise ratio measured in advance only for the transmission cable and temporal fluctuation of a signal. The estimating unit estimates a temporal fluctuation of a signal transmitted through the transmission cable connecting the pair of the transmitting/receiving apparatuses, from the signal-to-noise ratio calculated by the calculator and the relationship information stored in the storage unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings. Components having substantially the same function are designated with the same reference numerals in the drawings, and the repeated description will be avoided.

First Exemplary Embodiment

Figure 1:
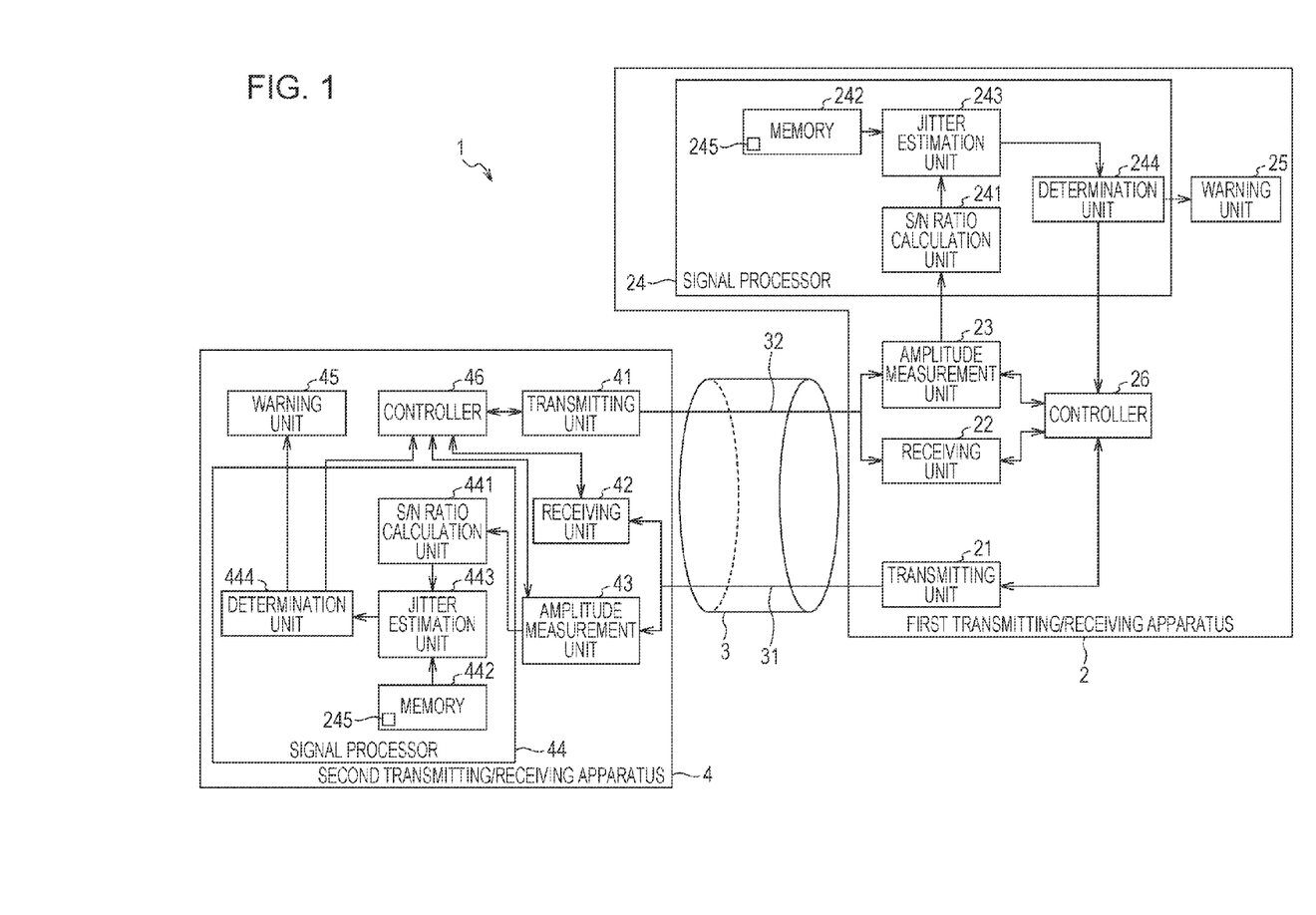
FIG. 1 is a block diagram illustrating an exemplary configuration of a transmitting/receiving system according to a first exemplary embodiment of the present invention.
Figure 2:
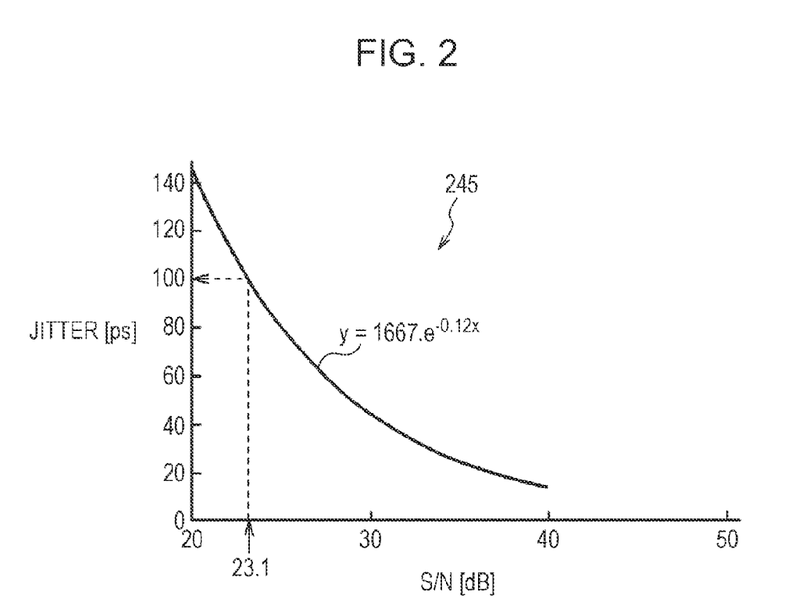
FIG. 2 is a diagram illustrating an example of S/N ratio-jitter relationship information.

FIG. 1 is a block diagram illustrating an exemplary configuration of a transmitting/receiving system according to a first exemplary embodiment of the present invention. FIG. 2 is a diagram illustrating an example of S/N ratio-jitter relationship information.

As illustrated in FIG. 1, a transmitting/receiving system 1 includes a pair of transmitting/receiving apparatuses, i.e., a first transmitting/receiving apparatus 2 and a second transmitting/receiving apparatus 4, which are connected to each other through a transmission cable 3 having first and second signal lines 31 and 32, through each of which a signal is transmitted in one direction.

The first signal line 31 of the transmission cable 3 is used for transmitting a signal from the first transmitting/receiving apparatus 2, whereas the second signal line 32 is used for transmitting a signal from the second transmitting/receiving apparatus 4. Signals transmitted through the first and second signal lines 31 and 32 are digital signals, for example, having a communication frequency of 500 Mbps or higher or 1 Gbps or higher. Each of the first and second signal lines 31 and 32 may include two differential lines, through each of which a differential signal is transmitted.

The first transmitting/receiving apparatus 2 generally includes a transmitting unit 21 that transmits a signal, a receiving unit 22 that receives a signal, an amplitude measurement unit 23 that measures the amplitude of the received signal, a signal processor 24 that performs, for example, determination based on the amplitude measured by the amplitude measurement unit 23, a warning unit 25 that is connected to the signal processor 24, and a controller 26 that controls the units in the first transmitting/receiving apparatus 2. The first transmitting/receiving apparatus 2 transmits a link-up signal to the second transmitting/receiving apparatus 4, and then transmits a signal carrying image information or the like reproduced by, for example, a reproducing unit to the second transmitting/receiving apparatus 4. A link-up signal transmitted from the first transmitting/receiving apparatus 2 is an example of a check signal.

Similarly to the first transmitting/receiving apparatus 2, the second transmitting/receiving apparatus 4 generally includes a transmitting unit 41 that transmits a signal, a receiving unit 42 that receives a signal, an amplitude measurement unit 43 that measures the amplitude of the received signal, a signal processor 44 that performs, for example, determination based on the amplitude measured by the amplitude measurement unit 43, a warning unit 45 that is connected to the signal processor 44, and a controller 46 that controls the units in the second transmitting/receiving apparatus 4. The second transmitting/receiving apparatus 4 transmits a link-up signal to the first transmitting/receiving apparatus 2, and then transmits a signal carrying, for example, status information to the first transmitting/receiving apparatus 2 and transmits, for example, the image information transmitted from the first transmitting/receiving apparatus 2 to a video display apparatus so as to display the image or the like. A link-up signal transmitted from the second transmitting/receiving apparatus 4 is an example of a check signal.

Detailed Configuration of First Transmitting/Receiving Apparatus

When a link-up is to be established, the transmitting unit 21 transmits a link-up signal through the first signal line 31 to the second transmitting/receiving apparatus 4. After the link-up is established, the transmitting unit 21 transmits a signal to be transmitted, such as a signal carrying image information, through the first signal line 31 to the second transmitting/receiving apparatus 4.

When the link-up is to be established, the receiving unit 22 receives a link-up signal transmitted from the second transmitting/receiving apparatus 4 through the second signal line 32.

The amplitude measurement unit 23 measures the amplitudes of two types of signals received through the second signal line 32. In other words, in the state in which the receiving unit 22 has not received a link-up signal through the second signal line 32, when the transmitting unit 21 transmits a link-up signal through the first signal line 31, the amplitude measurement unit 23 measures the amplitude of a signal received through the second signal line 32 as a noise value. Thus, the noise value which is caused by crosstalk from the first signal line 31 to the second signal line 32 is determined. In the state in which the transmitting unit 21 does not transmit the link-up signal through the first signal line 31, the amplitude measurement unit 23 measures the amplitude of the link-up signal received through the second signal line 32 by the receiving unit 22 as a signal value. The amplitude measurement unit 23 outputs the measured noise and signal values to a signal-to-noise (S/N) ratio calculation unit 241 described below, as measurement results. The strength of a signal as well as the amplitude may be measured.

Signal Processor

The signal processor 24 includes the S/N ratio calculation unit 241, a memory 242, a jitter estimation unit 243, and a determination unit 244.

The S/N ratio calculation unit 241 calculates an S/N ratio on the basis of the two different measurement values measured by the amplitude measurement unit 23. That is, the S/N ratio calculation unit 241 calculates the square of the noise value measured by the amplitude measurement unit 23 to obtain the signal strength as a first value, calculates the square of the signal value measured by the amplitude measurement unit 23 to obtain the signal strength as a second value, and calculates an S/N ratio by dividing the second value by the first value.

The memory 242 stores S/N ratio-jitter relationship information 245. The S/N ratio-jitter relationship information 245 is obtained through preliminary measurement only for the transmission cable 3.

The jitter estimation unit 243 obtains a jitter corresponding to the S/N ratio calculated by the S/N ratio calculation unit 241 from the S/N ratio-jitter relationship information 245 stored in the memory 242.

The determination unit 244 compares the jitter estimated by the jitter estimation unit 243 with a predetermined threshold. When the jitter is equal to or larger than the threshold, the determination unit 244 outputs a signal indicating an abnormality to the warning unit 25 and the controller 26. When the jitter is smaller than the threshold, the determination unit 244 outputs a signal indicating that the jitter is in a normal range to the controller 26. Alternatively, the determination unit 244 may compare a jitter estimated by the jitter estimation unit 243 with a predetermined threshold, and, when the jitter is equal to or larger than the threshold, output a signal indicating that the jitter is equal to or larger than the threshold.

When the determination unit 244 outputs the signal indicating an abnormality, the warning unit 25 outputs a warning of abnormality. Examples of warning output include lighting of a lamp, emission of warning sound, and display of a screen indicating that an abnormality occurs or that the jitter is equal to or larger than the threshold.

The controller 26 includes a central processing unit (CPU). The CPU of the controller 26 controls the link-up operations in accordance with programs, and, after the link-up is established, controls transmission of signals to be transmitted. In the control of the link-up, the following operations are performed. In the state in which the receiving unit 22 has not received a link-up signal through the second signal line 32, when the transmitting unit 21 transmits a link-up signal through the first signal line 31, the strength of a signal received by the receiving unit 22 is obtained as a first value. In the state in which the transmitting unit 21 does not transmit the link-up signal through the first signal line 31, the strength of the link-up signal received through the second signal line 32 by the receiving unit 22 is obtained as a second value. The controller 26 causes the S/N ratio calculation unit 241 to calculate an S/N ratio by dividing the second value by the first value. In the control of transmission of signals to be transmitted, the controller 26 causes a signal carrying, for example, the image information to be transmitted to the second transmitting/receiving apparatus 4.

Detailed Configuration of Second Transmitting/Receiving Apparatus

When a link-up is to be established, the transmitting unit 41 transmits a link-up signal through the second signal line 32 to the first transmitting/receiving apparatus 2. After the link-up is established, the transmitting unit 41 transmits a signal to be transmitted, such as a signal carrying status information, through the second signal line 32 to the first transmitting/receiving apparatus 2.

When the link-up is to be established, the receiving unit 42 receives a link-up signal transmitted from the first transmitting/receiving apparatus 2 through the first signal line 31.

The amplitude measurement unit 43 measures the amplitudes of two types of signals received through the first signal line 31. In other words, in the state in which the receiving unit 42 has not received a link-up signal through the first signal line 31, when the transmitting unit 41 transmits a link-up signal through the second signal line 32, the amplitude measurement unit 43 measures the amplitude of a signal received through the first signal line 31 as a noise value. Thus, a noise value which is caused by crosstalk from the second signal line 32 to the first signal line 31 is determined. In the state in which the transmitting unit 41 does not transmit the link-up signal through the second signal line 32, the amplitude measurement unit 43 measures the amplitude of the link-up signal received through the first signal line 31 by the receiving unit 42 as a signal value. The amplitude measurement unit 43 outputs the measured noise and signal values to an S/N ratio calculation unit 441 described below, as measurement results.

The signal processor 44 includes the S/N ratio calculation unit 441, a memory 442, a jitter estimation unit 443, and a determination unit 444. The S/N ratio calculation unit 441, the memory 442, the jitter estimation unit 443, and the determination unit 444 are similar to the S/N ratio calculation unit 241, the memory 242, the jitter estimation unit 243, and the determination unit 244 of the first transmitting/receiving apparatus 2, respectively, and will not be described.

The warning unit 45 is similar to the warning unit 25 of the first transmitting/receiving apparatus 2, and will not be described.

The controller 46 includes a central processing unit (CPU). The CPU of the controller 46 controls the link-up operations in accordance with programs, and, after the link-up is established, controls transmission of signals to be transmitted. In the control of the link-up, the following operations are performed. In the state in which the receiving unit 42 has not received a link-up signal through the first signal line 31, when the transmitting unit 41 transmits a link-up signal through the second signal line 32, the strength of a signal received by the receiving unit 42 is obtained as a first value. In the state in which the transmitting unit 41 does not transmit the link-up signal through the second signal line 32, the strength of the link-up signal received through the first signal line 31 by the receiving unit 42 is obtained as a second value. The controller 46 causes the S/N ratio calculation unit 441 to calculate an S/N ratio by dividing the second value by the first value. In the control of transmission of signals to be transmitted, the controller 46 causes a signal carrying, for example, status information to be transmitted to the first transmitting/receiving apparatus 2, and causes, for example, the image information transmitted from the first transmitting/receiving apparatus 2 to be output to a video display apparatus to display the image or the like.

Operation According to First Exemplary Embodiment

Now, an exemplary operation of the transmitting/receiving system 1 according to the first exemplary embodiment will be described according to the flowchart in FIG. 3.

In step S1, the transmitting unit 21 of the first transmitting/receiving apparatus 2 transmits a link-up signal through the first signal line 31 of the transmission cable 3 to the second transmitting/receiving apparatus 4 under control of the controller 26. At that time, the second transmitting/receiving apparatus 4 is in a signal-output stopping state in which a link-up signal is not transmitted (in step S21).

In step S2, the amplitude measurement unit 23 of the first transmitting/receiving apparatus 2 measures the amplitude of a received signal under control of the controller 26. In step S3, the S/N ratio calculation unit 241 of the signal processor 24 stores the amplitude measured by the amplitude measurement unit 23 as a noise value therein. In step S4, the transmitting unit 21 of the first transmitting/receiving apparatus 2 stops output of the link-up signal under control of the controller 26.

In step S22, the transmitting unit 41 of the second transmitting/receiving apparatus 4 transmits a link-up signal through the second signal line 32 of the transmission cable 3 to the first transmitting/receiving apparatus 2.

In step S5, the amplitude measurement unit 23 of the first transmitting/receiving apparatus 2 measures the amplitude of the received link-up signal. In step S6, the S/N ratio calculation unit 241 of the signal processor 24 obtains the amplitude measured by the amplitude measurement unit 23 as a signal value, and calculates an S/N ratio by dividing the square of the signal value by the square of the noise value stored therein.

The jitter estimation unit 243 obtains a jitter corresponding to the S/N ratio calculated by the S/N ratio calculation unit 241 with reference to the S/N ratio-jitter relationship information 245 stored in the memory 242. For example, the jitter is 100 ps when the S/N ratio is 23.1 dB.

The determination unit 244 determines whether or not the jitter estimated by the jitter estimation unit 243 is equal to or larger than the predetermined threshold. If the jitter is equal to or larger than the threshold (No in step S8), the determination unit 244 outputs a signal indicating an abnormality to the warning unit 25 and the controller 26. In step S10, the warning unit 25 outputs a warning on the basis of the signal indicating an abnormality.

If the jitter is smaller than the threshold (Yes in step S8), the determination unit 244 outputs a signal indicating that the jitter is in a normal range to the controller 26. In step S9, the transmitting unit 21 transmits a signal carrying, for example, image information reproduced by a reproducing unit through the first signal line 31 to the second transmitting/receiving apparatus 4 under control of the controller 26.

Similarly, the second transmitting/receiving apparatus 4 operates according to the above-described flowchart. When the link-up is to be established, the controller 46 operates like that of the first transmitting/receiving apparatus 2. After the link-up is established, the controller 46 transmits a signal carrying, for example, status information to the first transmitting/receiving apparatus 2, and outputs, for example, the image information transmitted from the first transmitting/receiving apparatus 2 to a video display apparatus so as to display the image or the like.

Effect of First Exemplary Embodiment

According to the first exemplary embodiment, when the jitter is equal to or larger than the threshold, a warning is output, enabling a user to recognize that, since the jitter is equal to or larger than the threshold, the failure of communication is caused by crosstalk.

Second Exemplary Embodiment

Figure 4:
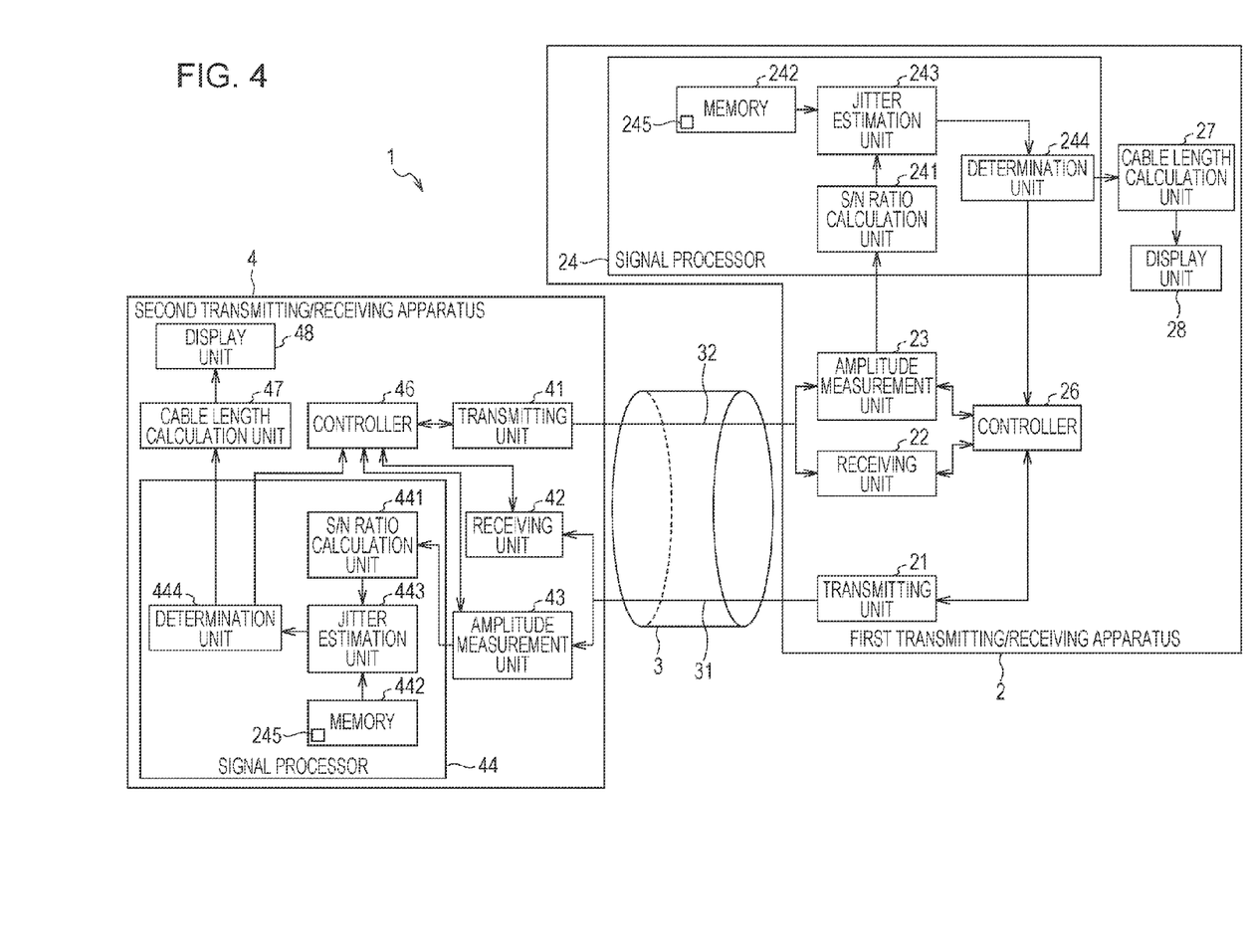
FIG. 4 is a block diagram illustrating an exemplary configuration of a transmitting/receiving system according to a second exemplary embodiment of the present invention.

FIG. 4 is a block diagram illustrating an exemplary configuration of a transmitting/receiving system according to a second exemplary embodiment of the present invention. According to the first exemplary embodiment, when the jitter is equal to or larger than the threshold, only a warning is output. According to the second exemplary embodiment, notification that the cable length of the transmission cable 3 is to be shortened is displayed to address the crosstalk.

According to the second exemplary embodiment, similarly to the first exemplary embodiment, the first and second transmitting/receiving apparatuses 2 and 4 are connected to each other through the transmission cable 3. The first transmitting/receiving apparatus 2 includes the transmitting unit 21, the receiving unit 22, the amplitude measurement unit 23, the signal processor 24, and the controller 26 which are similar to those according to the first exemplary embodiment. The first transmitting/receiving apparatus 2 also includes a cable length calculation unit 27 that is connected to the determination unit 244 of the signal processor 24, and a display unit 28, such as a liquid crystal display, that is connected to the cable length calculation unit 27.

Similarly to the first transmitting/receiving apparatus 2, the second transmitting/receiving apparatus 4 includes the transmitting unit 41, the receiving unit 42, the amplitude measurement unit 43, the signal processor 44, and the controller 46, and also includes a cable length calculation unit 47 that is connected to the determination unit 444 of the signal processor 44, and a display unit 48, such as a liquid crystal display, that is connected to the cable length calculation unit 47.

Instead of outputting the determination result to the warning unit 25 as in the first exemplary embodiment, the determination unit 244 according to the second exemplary embodiment outputs the determination result to the cable length calculation unit 27 and the controller 26. That is, the determination unit 244 outputs notification of an abnormality to the cable length calculation unit 27 and the controller 26 when the jitter estimated by the jitter estimation unit 243 is equal to or larger than the threshold.

The cable length calculation unit 27 stores a predetermined target S/N ratio therein. The cable length calculation unit 27 obtains a difference between the current S/N ratio calculated by the S/N ratio calculation unit 241 and the target S/N ratio, obtains a value A obtained by dividing a difference between the signal value and the difference between the S/N ratios by the signal value, and displays a message "Make the cable length A times longer" on the display unit 28.

Operation of Second Exemplary Embodiment

Figure 5:
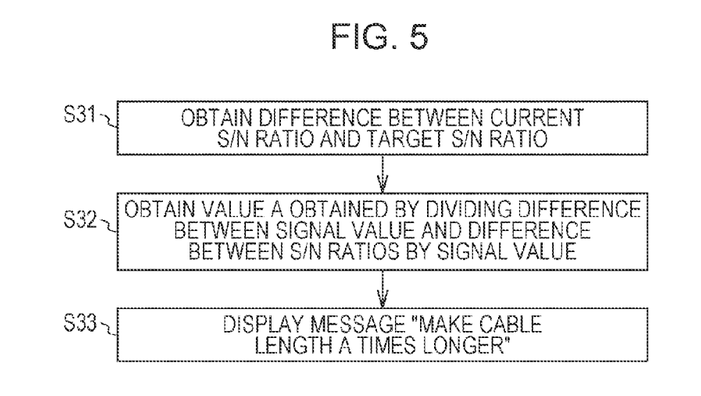
FIG. 5 is a flowchart of an exemplary operation of the transmitting/receiving system according to the second exemplary embodiment.

Now, an exemplary operation of the transmitting/receiving system 1 according to the second exemplary embodiment will be described in accordance with the flowchart in FIG. 5. The second transmitting/receiving apparatus 4 operates like first transmitting/receiving apparatus 2. Accordingly, the operation of the first transmitting/receiving apparatus 2 will be described below.

Figure 3:
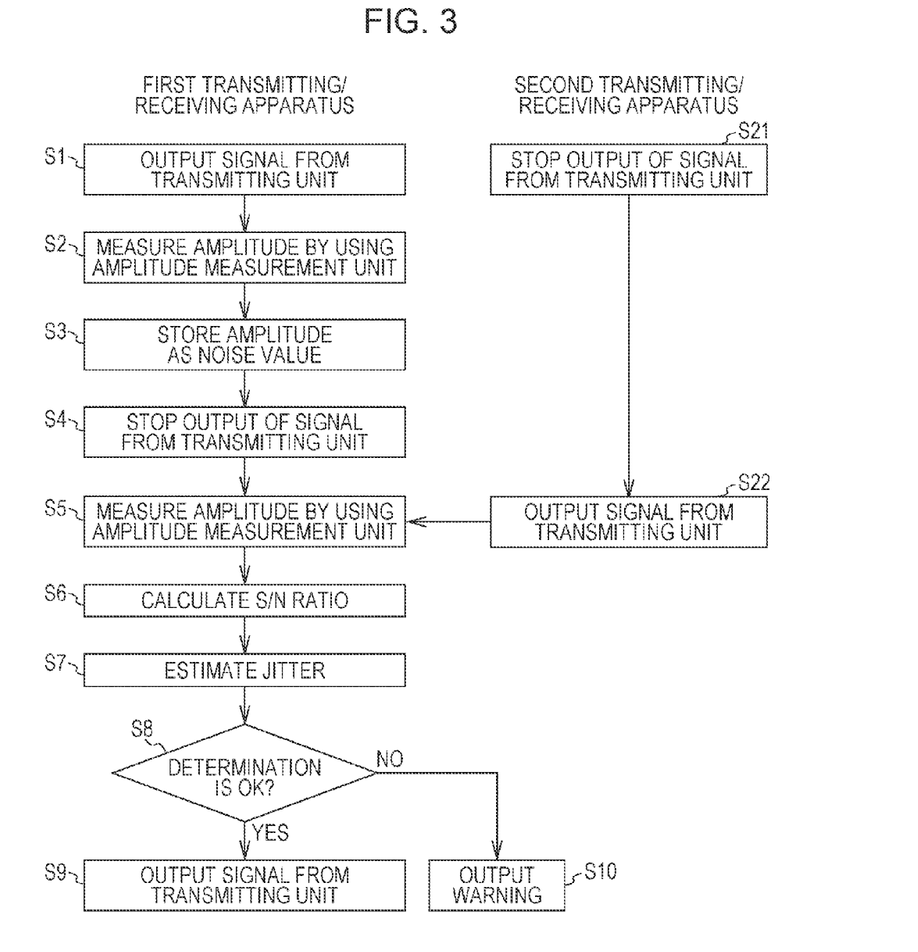
FIG. 3 is a flowchart of an exemplary operation of the transmitting/receiving system according to the first exemplary embodiment.

The procedure to step S8 which is indicated by "Determination is OK?" and step S9 which is indicated by "Output a signal from the transmitting unit" in the flowchart illustrated in FIG. 3 are similar to those according to the second exemplary embodiment, and will not be described.

In step S8 for determination illustrated in FIG. 3, if the jitter is equal to or larger than the threshold (No in step S8), the determination unit 244 outputs a signal indicating an abnormality to the cable length calculation unit 27 and the controller 26.

The cable length calculation unit 27 obtains a difference between the current S/N ratio and the target S/N ratio in step S31, obtains a value A obtained by dividing a difference between the signal value and the difference between the S/N ratios by the signal value in step S32, and displays a message "Make the cable length A times longer" on the display unit 28 in step S33.

Figure 6:
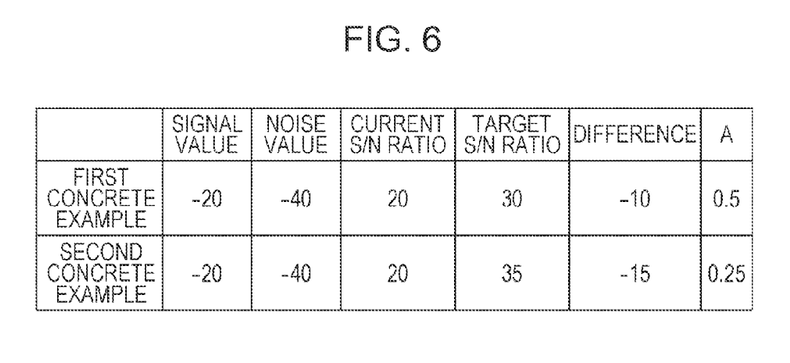
FIG. 6 is a diagram illustrating concrete examples corresponding to the second exemplary embodiment.

FIG. 6 is a diagram illustrating concrete examples corresponding to the second exemplary embodiment. The first concrete example indicates that the difference is −10 and the value A is 0.5 in the case where the signal value is −20, the noise value is −40, the current S/N ratio is 20, and the target S/N ratio is 30. In this case, a message "Make the cable length 0.5 times longer (one half cable length)" in which "the cable length" indicates that of the transmission cable 3 is displayed on the display unit 28. The second concrete example indicates that the difference is −15 and the value A is 0.25 in the case where the signal value is −20, the noise value is −40, the current S/N ratio is 20, and the target S/N ratio is 35. In this case, a message "Make the cable length 0.25 times longer (one quarter cable length)" in which "the cable length" indicates that of the transmission cable 3 is displayed on the display unit 28.

According to the second exemplary embodiment, when the jitter is equal to or larger than the threshold, it is possible to notify a user of how much the cable length of the transmission cable 3 is to be shortened.

Third Exemplary Embodiment

Figure 7:
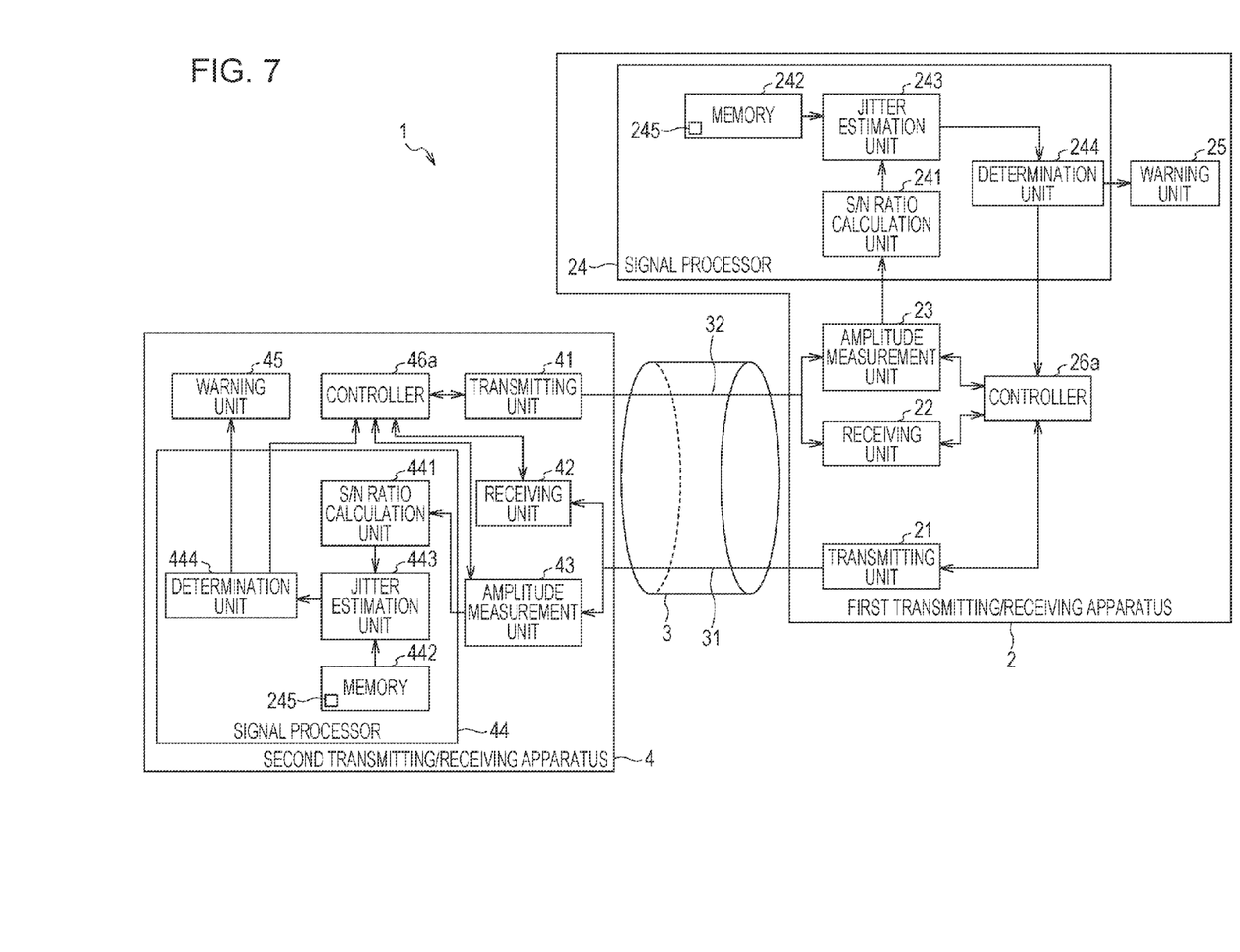
FIG. 7 is a block diagram illustrating an exemplary configuration of a transmitting/receiving system according to a third exemplary embodiment of the present invention.

FIG. 7 is a block diagram illustrating an exemplary configuration of a transmitting/receiving system according to a third exemplary embodiment of the present invention. According to the first exemplary embodiment, when the jitter is equal to or larger than the threshold, only a warning is output. According to the third exemplary embodiment, to address the crosstalk, the frequency of a signal to be transmitted is made small so that the jitter is smaller than the threshold. The first and second transmitting/receiving apparatuses 2 and 4 according to the third exemplary embodiment are similar to those according to the first exemplary embodiment except for controllers 26a and 46a.

When the controller 26a of the first transmitting/receiving apparatus 2 receives a signal indicating that the jitter is equal to or larger than the threshold from the determination unit 244, the controller 26a controls the transmitting unit 21 to output a link-up signal at a frequency that is reduced to one half. In this state, the controller 26a controls the amplitude measurement unit 23 to measure a noise value, controls the S/N ratio calculation unit 241 to calculate an S/N ratio, controls the jitter estimation unit 243 to estimate a jitter, and controls the determination unit 244 to perform determination. Until the determination unit 244 determines that the jitter is smaller than the threshold, the above-described operations are repeated. The controller 46a of the second transmitting/receiving apparatus 4 operates like the controller 26a of the first transmitting/receiving apparatus 2. The value used for reducing the frequency is not limited to half, and may be, for example, two-third.

Operation of Third Exemplary Embodiment

Figure 8:
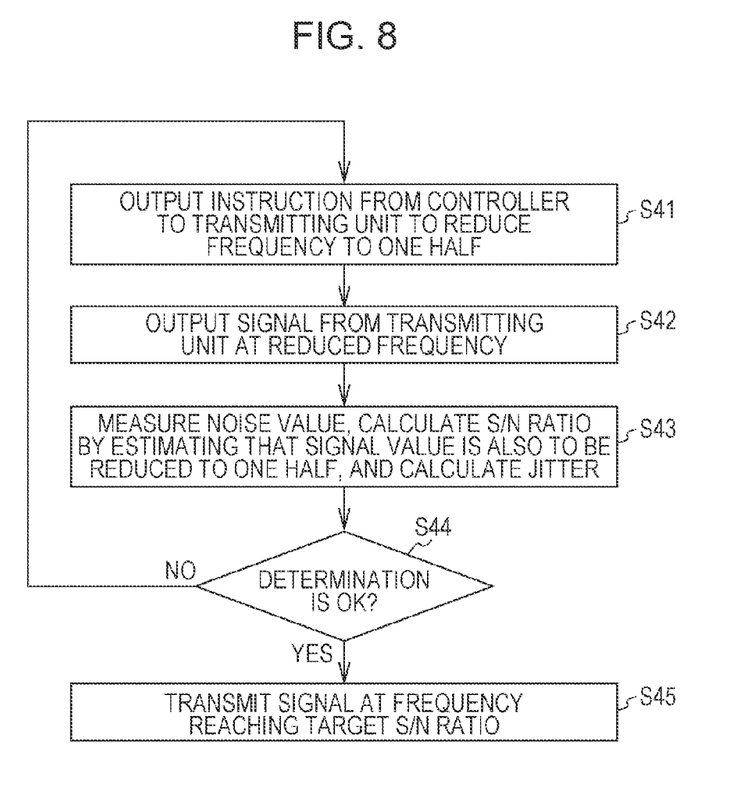
FIG. 8 is a flowchart of an exemplary operation of the transmitting/receiving system according to the third exemplary embodiment.

Now, an exemplary operation of the transmitting/receiving system 1 according to the third exemplary embodiment will be described according to the flowchart in FIG. 8. The second transmitting/receiving apparatus 4 operates like the first transmitting/receiving apparatus 2. Accordingly, the operation of the first transmitting/receiving apparatus 2 will be described below.

The procedure to step S8 which is indicated by "Determination is OK?" and step S9 which is indicated by "Output a signal from the transmitting unit" in the flowchart illustrated in FIG. 3 are similar to those according to the third exemplary embodiment, and will not be described.

In step S8 for determination illustrated in FIG. 3, if the jitter is equal to or larger than the threshold (No in step S8), the determination unit 244 outputs a signal indicating an abnormality to the warning unit 25 and the controller 26a.

In step S41, the controller 26a instructs the transmitting unit 21 to reduce the frequency to one half. In step S42, the transmitting unit 21 outputs a link-up signal at a frequency that is reduced to one half. In step S43, the amplitude measurement unit 23 measures a noise value; the S/N ratio calculation unit 241 estimates that the signal value will be also reduced to one half, and calculates an S/N ratio; and the jitter estimation unit 243 estimates a jitter with reference to the S/N ratio-jitter relationship information 245 stored in the memory 242.

The determination unit 244 determines whether or not the jitter estimated by the jitter estimation unit 243 is equal to or larger than the threshold that is predetermined for jitter. If the jitter is equal to or larger than the threshold (No in step S44), the process returns back to step S41. If the jitter is smaller than the threshold (Yes in step S44), the transmitting unit 21 transmits a signal carrying, for example, image information at a frequency that reaches the target S/N ratio, through the first signal line 31 to the second transmitting/receiving apparatus 4 in step S45.

According to the third exemplary embodiment, when the jitter is equal to or larger than the threshold, the frequency of a signal is reduced, enabling link-up to be automatically established.

The present invention is not limited to the above-described exemplary embodiments. As long as the gist of the present invention is not changed, various modifications may be made. For example, some or all of the components of the first and second transmitting/receiving apparatuses 2 and 4 may be constituted by a hardware circuit, such as a field programmable gate array (FPGA) or an application specific integrated circuit (ASIC). Alternatively, some or all of the components may be achieved in such a manner that the CPUs operate in accordance with programs in the computers in the first and second transmitting/receiving apparatuses 2 and 4.

As long as the gist of the present invention is not changed, the components according to the exemplary embodiments may be provided in any combination. For example, instead of the warning unit according to the third exemplary embodiment, the cable length calculation unit and the display unit according to the second exemplary embodiment may be included. Alternatively, a user may select the way to address the crosstalk.

In addition, as long as the gist of the present invention is not changed, some of the components of the exemplary embodiments may be omitted. In the flowcharts according to the exemplary embodiments, steps may be, for example, added, deleted, changed, or switched. Furthermore, programs used for the above-described exemplary embodiments may be stored in a recording medium such as a compact disc-read-only memory (CD-ROM) so as to be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transmitting/receiving system comprising:
    a pair of transmitting/receiving apparatuses that are connected to each other through a transmission cable having first and second signal lines, through each of which a signal is transmitted in one direction, each of the transmitting/receiving apparatuses including
        a transmitting unit that transmits the signal through a corresponding one of the first and second signal lines,
        a receiving unit that receives the signal through a corresponding one of the first and second signal lines,
        a calculator that calculates a signal-to-noise ratio of the signal received through a corresponding one of the first and second signal lines by the receiving unit,
        a controller that controls the calculator to calculate the signal-to-noise ratio by obtaining a strength of a signal as a first value, the signal being received by the receiving unit when the transmitting unit transmits a check signal through a corresponding one of the first and second signal lines in a state in which the receiving unit has not received a check signal through a corresponding one of the first and second signal lines, obtaining a signal strength as a second value, the signal strength being obtained when the check signal is received through a corresponding one of the first and second signal lines by the receiving unit in the state in which the transmitting unit does not transmit a check signal through a corresponding one of the first and second signal lines, and dividing the second value by the first value,
        a storage unit that stores relationship information about a relationship between a signal-to-noise ratio measured in advance only for the transmission cable and temporal fluctuation of a signal, and
        an estimating unit that estimates a temporal fluctuation of a signal transmitted through the transmission cable connecting the pair of the transmitting/receiving apparatuses, from the signal-to-noise ratio calculated by the calculator and the relationship information stored in the storage unit.

2. The transmitting/receiving system according to claim 1, further comprising:
    a determination unit that determines whether or not the temporal fluctuation of a signal estimated by the estimating unit is equal to or larger than a threshold.

3. The transmitting/receiving system according to claim 2, further comprising:
    an output unit that, when the determination unit determines that the temporal fluctuation of a signal is equal to or larger than the threshold, outputs a notification about the determination.

4. The transmitting/receiving system according to claim 2, further comprising:
    a display unit that, when the determination unit determines that the temporal fluctuation of a signal is equal to or larger than the threshold, displays a notification that the transmission cable is to be shortened in accordance with the signal-to-noise ratio calculated by the calculator.

5. The transmitting/receiving system according to claim 2, wherein, when the determination unit determines that the temporal fluctuation of a signal is equal to or larger than the threshold, the controller controls the transmitting unit to transmit the check signal at a frequency that is reduced to such a degree that the temporal fluctuation of a signal is made smaller than the threshold.

6. A non-transitory computer readable medium storing a program causing computers to execute a process, the computers being included in a pair of transmitting/receiving apparatuses that are connected to each other through a transmission cable having first and second signal lines, through each of which a signal is transmitted in one direction, the process comprising:
    transmitting the signal through the first or second signal line;
    receiving the signal through the second or first signal line;
    calculating a signal-to-noise ratio of the signal received through the second or first signal line;
    causing calculation of the signal-to-noise ratio by obtaining a strength of a signal as a first value, the signal being received when a check signal is transmitted through the first or second signal line in a state in which a check signal has not been received through the second or first signal line, obtaining a signal strength as a second value, the signal strength being obtained when the check signal is received through the second or first signal line in the state in which a check signal is not transmitted through the first or second signal line, and dividing the second value by the first value; and estimating a temporal fluctuation of a signal transmitted through the transmission cable connecting the pair of the transmitting/receiving apparatuses, from the calculated signal-to-noise ratio and stored relationship information about a relationship between a signal-to-noise ratio measured in advance for only the transmission cable and temporal fluctuation of a signal.

7. A transmitting/receiving method performed in a pair of transmitting/receiving apparatuses that are connected to each other through a transmission cable having first and second signal lines, through each of which a signal is transmitted in one direction, the method comprising:

transmitting the signal through the first or second signal line;

receiving the signal through the second or first signal line;

calculating a signal-to-noise ratio of the signal received through the second or first signal line;

causing calculation of the signal-to-noise ratio by obtaining a strength of a signal as a first value, the signal being received when a check signal is transmitted through the first or second signal line in a state in which a check signal has not been received through the second or first signal line, obtaining a signal strength as a second value, the signal strength being obtained when the check signal is received through the second or first signal line in the state in which a check signal is not transmitted through the first or second signal line, and dividing the second value by the first value; and estimating a temporal fluctuation of a signal transmitted through the transmission cable connecting the pair of the transmitting/receiving apparatuses, from the calculated signal-to-noise ratio and stored relationship information about a relationship between a signal-to-noise ratio measured in advance for only the transmission cable and temporal fluctuation of a signal.

* * * * *